UNITED STATES PATENT OFFICE.

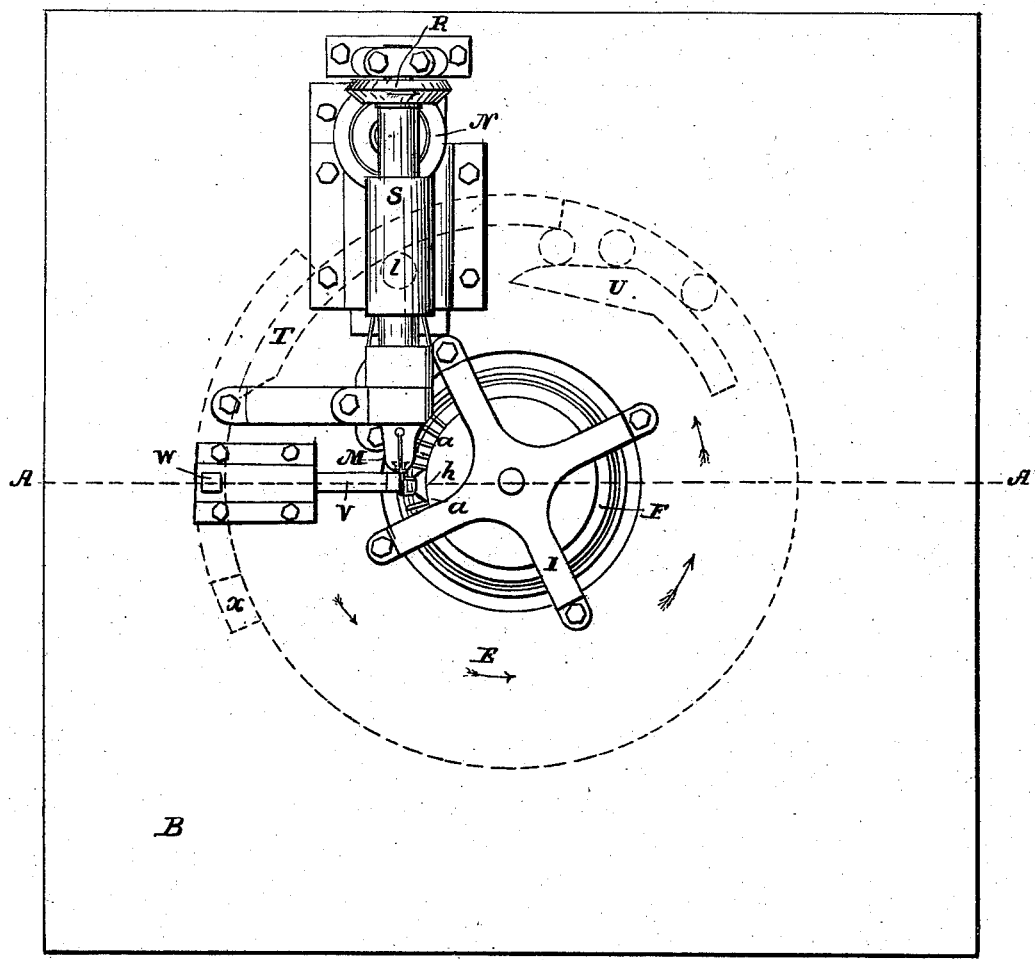

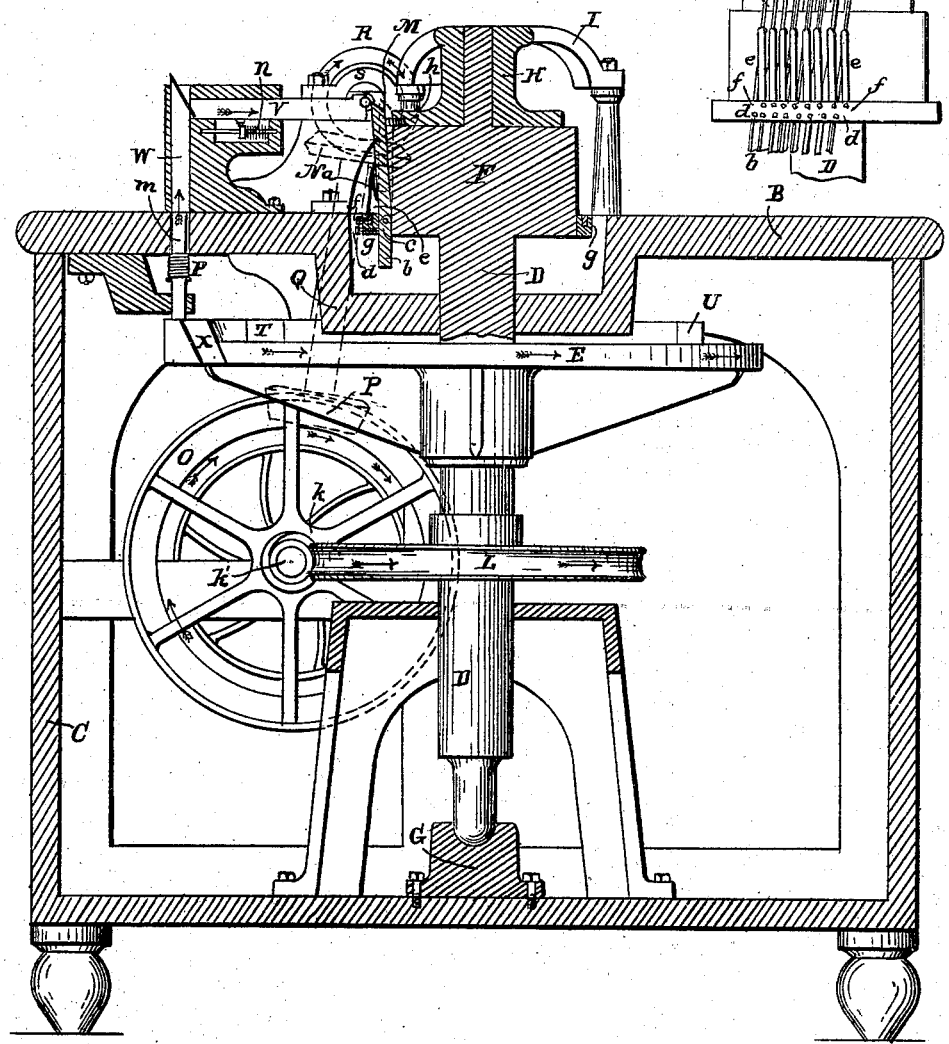

GEORGE F. WILSON AND JAMES M. WHITING, OF PROVIDENCE, RHODE ISLAND.

IMPROVEMENT IN MACHINES FOR THREADING SCREWS.

Specification forming part of Letters Patent No. 11,344, dated July 18, 1854.

*To all whom it may concern:*

Be it known that we, GEORGE FRANCIS WILSON, of Providence, in the county of Providence, in the State of Rhode Island, and JAMES MONROE WHITING, of North Providence, of the county and State aforesaid, have invented certain new and useful Improvements in Screw-Cutting Machines, of which the following is a full, clear, and exact description, reference being had to the annexed drawings, making part of this specification, in which—

Figure 1 is a plan of our machine. Fig. 2 is a vertical section through the same upon the line A A of Fig. 1, the revolving cam-disk and the parts connected therewith being shown in elevation. Fig. 3 is a detached view of the head which carries the chasers.

In the machines heretofore in use for cutting "wood-screws" the cutters have been caused to operate several times upon the surface of the blanks, returning after each cut and sinking each time deeper and deeper until the screw was completed. A great amount of time was thus consumed in making the successive cuts and in returning after the cuts are completed. Efforts have been made to diminish this difficulty by constructing the chaser with two cutting-points at a fixed distance from each other, both working at the same time upon the blank and cutting two shavings at once. So great a pressure was, however, put upon the blanks by this arrangement that the advantage gained was very limited, the same tools being required to return and recut the screw. In other cases a gang or series of cutters has been employed, the whole series, after advancing to operate upon the blank, being caused to return previous to making another cut. In each of these cases considerable time is required for the return of the chasers preparatory to each cut, and our invention has for its object to economize the time thus lost.

Our invention consists in giving to the cutters a continuous movement in one direction, whereby they may be employed in cutting screws one after the other without wasting time heretofore consumed by the return of the cutters. This principle may obviously be carried into effect by moving the cutters in a circle around a center, in the manner which will be hereinafter described, or by operating them in elliptical or other curved tracks.

To aid in carrying out the first part of our invention, we have adopted a new and peculiar method of arranging the cutters within the cutter-head, by which, while they are capable of being moved easily and expeditiously up to their work, they are held securely and firmly without the possibility of being moved out of place, however great the strain that may be brought to bear upon them.

To enable others skilled in the art to make and use our invention, we will proceed to describe the method which we have adopted with success of carrying it out, referring, generally, to those parts which do not differ from the corresponding elements of other machines, and describing more particularly the changes and improvements which form the subject of our invention.

B is the bed of the machine, which is constructed of cast-iron or of any other sufficiently substantial material and firmly and solidly secured to the frame-work C.

Through the center of the machine rises the revolving shaft D, which carries the cutter-head F, with its gang of cutters, and also the horizontal disk E, upon which are secured the cams that operate the rest and the nippers which hold the blank while it is being operated upon. The shaft D is stepped into the bearing G at the base of the machine and runs at its top extremity in the stationary bearing H, which is supported by suitable arms I and columns K, which stride the space occupied by the revolving cutter-head F.

The manner in which the cutters or chasers are formed and secured to the head will now be described. They are made in two parts, *a* and *b*, which are united by a hinge or pivot at *c*. This compound chaser is secured to the head F by screws *d*, which bear upon the lower portion *b* only of the chasers, or in any other suitable and efficient manner. The chasers lie in slots cut in the side of the head, as seen in all the figures, their upper portions *a* being pressed back into these slots by springs *e*, which are secured by screws *f* to the same projection *g* from the bottom of the head which carries the chasers, and each one is independent of the others in its movement by the pattern $h$.

$h$ is the pattern, which is secured to the stationary bearing H in such a position that as the head revolves the upper portions $a$ of the chasers shall come successively in contact with it and be forced out against the action of the springs $e$, the motion of the chasers being governed by the contour of the pattern $h$. They are thus brought up in quick succession to their work upon the screw-blank in a manner which will be hereinafter explained, each chaser projecting slightly farther from the circle or other line of motion than the one which precedes it, by which arrangement they are enabled to cut successively deeper and deeper into the blank. The pattern may be varied in length and width to suit the varying form and size of screws, and so may other parts of the machine. It is obvious that this cutter-head can be adapted to a right-line movement, reciprocating in the ordinary way as well as to the continuous movement of our machine.

K' is the main driving-shaft, which carries the endless screw $k$. This latter drives the wheel L upon the vertical shaft D.

M are the nippers, which are arranged and actuated in a manner similar to those of other screw-cutting machines and need not therefore be particularly described. They are revolved in the following manner: O is a bevel-gear upon the main shaft K', which drives the bevel-wheel P upon the shaft Q, at the other extremity of which is secured the bevel-wheel N, which engages with the wheel R upon the shaft of the nippers, and thus the latter are revolved. The nippers are closed at the proper time by means of the sleeve S. $l$ is a roller upon an arm descending from this sleeve, which, coming in contact with the inclined edge of the cam T upon the disk E, is borne in for the purpose of closing the nippers, which are again opened by the cam U, which presses out the roller $l$ and carries back the sleeve.

The screws are fed to the nippers by any well-known or efficient method, which need not be here described.

V is the rest, which supports the screw-blank while it is being cut. It is brought into the requisite position for this purpose by the wedge W, which is raised at the required instant by the inclined end of the cam X upon the disk E, in a manner well known in machines of this character and seen in Fig. 2, when the cam X in its revolution passes from beneath the rod $m$, which descends from the wedge W, and the latter descends, being forced down by the spring $p$ preparatory to feeding another blank to the nippers.

Operation: A screw-blank being fed to the nippers M, the inclined edge of the cam T comes in contact the next instant with the roller $l$, which closes the nippers, as before explained. The cam X then raises the wedge W and forces forward the rest V, as seen in Figs. 1 and 2. The foremost of the cutters $a$ is then brought up into contact with the screw by means of the pattern $h$, the other cutters following in quick succession, each cutting deeper than the one which preceded because of greater width, as before explained. The screw is thus completed in a space of time far less than that required for the (reciprocally) successive cuts of a single chaser moving back and forth. The rest V is then withdrawn, the nippers are opened, and the screw is dropped, a fresh blank being fed to the nippers and the operation continued as before.

Thus far we have described and represented but one rest and pair of nippers; but it is evident that as many may be employed upon the machine as can be accommodated around the cylindrical head, which carries the cutters.

We do not claim the use of a gang or series of cutters which are allowed to return after each operation and previous to making a new cut, as this has been done before; but What we do claim as our invention, and desire to secure by Letters Patent, is—

1. Arranging the cutters upon the periphery of a disk or its equivalent and bringing them up to the blanks by a continuous motion, in the manner and for the purpose substantially as herein described.

2. The peculiar manner in which the chasers are made and secured to the cutter-head F, they being let into grooves or recesses in the head and having their upper portions hinged to their lower portions, which latter are secured to the head by screws or otherwise, by which arrangement, while the chasers are held secure from all possibility of displacement, they may be easily and expeditiously brought up to their work, as required.

GEO. F. WILSON.
JAMES M. WHITING.

Witnesses:
BENJ. T. EAMES,
THOS. T. JAMES.